United States Patent [19]
Sleight et al.

[11] Patent Number: 5,202,891
[45] Date of Patent: Apr. 13, 1993

[54] NONLINEAR OPTICAL MATERIAL

[75] Inventors: Arthur W. Sleight, Philomath; Jinfan Huang, Corvallis, both of Oreg.

[73] Assignee: State of Oregon Acting by and through the State Board of Higher Education of behalf of Oregon State University, Eugene, Oreg.

[21] Appl. No.: 813,211

[22] Filed: Dec. 23, 1991

[51] Int. Cl.$^5$ .............................................. H01S 3/10
[52] U.S. Cl. .................................... 372/21; 372/22; 359/328
[58] Field of Search .................. 372/21, 22; 359/328; 385/122

[56] References Cited

U.S. PATENT DOCUMENTS

| | | | |
|---|---|---|---|
| 4,659,223 | 4/1987 | Huignard et al. | 356/350 |
| 4,726,639 | 2/1988 | Brody | 350/3.64 |
| 4,807,970 | 2/1989 | Dube et al. | 350/3.64 |
| 4,826,283 | 5/1989 | Chuangtian et al. | 350/96.12 |
| 4,927,220 | 5/1990 | Hesselink et al. | 350/3.64 |

OTHER PUBLICATIONS

Pepper, et al., "The Photorefractive Effect," *Scientific American*, pp. 62–74 (Oct. 1990).
Stucky, et al., "The Potassium Titanyl Phosphate Structure Field: A Model for New Nonlinear Optical Materials," *Chemistry of Materials* 1:492–509 (1989).
Glass, "Materials for Photonic Switching and Information Processing," *MRS Bulletin*, pp. 16–20 (Aug. 1988).

*Primary Examiner*—Leon Scott, Jr.
*Attorney, Agent, or Firm*—Klarquist, Sparkman, Campbell, Leigh & Whinston

[57] ABSTRACT

Nonlinear optical materials having the general formula $Ca_{1.40-x}M_xV_{0.98\pm0.05}O_{4.00\pm0.08}$ wherein X is 0.07 to 0.43 and M is selected from the group consisting of Bi, La, Ce, Y, Pm, Pr, Nd, Sm, Eu, Gd, Tb, Dy, Ho, Er, Tm, Yb, Lu, Sc, and mixtures thereof are described. Compositions satisfying this formula belong to the space group R3c wherein $a=b=10.8\pm0.1$ Å, and $c=38.0\pm0.3$ Å. These NLO compositions are capable of doubling the frequency of light at about 0.1 to about 3.3 times the efficiency of $KH_2PO_4$(KDP). No damage to the NLO material is observed when they are exposed to high-power lasers.

34 Claims, 4 Drawing Sheets

NONLINEAR OPTICAL MATERIAL

This invention was made with government support under Agreement No. C029005 awarded by the United States Department of Interior Bureau of Mines. The government has certain rights in the invention.

FIELD OF THE INVENTION

This invention relates to nonlinear optical (NLO) materials.

BACKGROUND OF THE INVENTION

An NLO material is a material which has optical properties that are modified by light as it passes through the material. The modification of the optical properties may be caused by an induced electronic charge displacement (polarization) that acts as an oscillating dipole. The oscillating dipole may cause the material to emit a photon. When the polarization of the material is linear, the emitted photon has the same frequency as the light incident upon the material. If the polarization is nonlinear, the frequency of the light emerging from the material may be some integer value times the frequency of the incident light. For instance, the net effect of frequency doubling is that two photons with a frequency $\Omega$ combine to generate a single photon having a frequency equal to $2\Omega$. Thus, propagation of the waves in synchronization (phase-matching) allows the light's frequency to double. Franken first discovered that NLO materials were capable of such second harmonic generation (SHG) in 1961. *Ann. Rev. Mater. Sci.*, 16:203-43 (1986). Phase-matching ability is a critical aspect of all NLO SHG materials.

NLO materials may also exhibit photorefractive phenomena. A photorefractive material is one in which low intensity light (light having an intensity of about 1/1000 of a watt) semi-permanently alters the material's refractive index (defined as the speed of light in a vacuum relative to the speed of light through the material). Photorefractive materials generally have easily distorted crystal lattices and virtually all such materials contain defects in the crystal structure that act as charge carriers. On an atomic level, the electrons in a photorefractive crystal are displaced by the oscillating electric field of an incident light wave. The ability of the electrons to be displaced is governed by:

(1) the direction and magnitude of the electric field;
(2) the nature of the potential well of the electron; and
(3) the frequency of the applied field.

One purpose of NLO materials is to introduce strong coupling between the electro-magnetic field of a primary light wave and a secondary light wave within the crystalline lattice. This coupling is referred to as internal modulation. Alternatively, the electro-magnetic field of a primary light wave may be modulated by coupling it to an externally applied electric field.

The light emerging from an internally or externally modulated light wave can be used for a number of practical applications, including: optical interconnection of electronic circuits; laser surgery; hologram generation; electro-optic wave guides utilizing surface-applied dopents; and for high-speed, light exploiting computers.

A number of NLO materials are known and such materials have been used in a variety of devices. For instance, LiNbO$_3$ was found to be photorefractive nearly 25 years ago. *Scientific American*, 62-74, October, 1990. Also, *Chemistry of Materials*, Vol. 1, No. 5, 492-509 lists a number of NLO compounds, most of which are derivatives of potassium titanyl phosphate. Other commonly used NLO materials include KDP and urea.

NLO materials have also been described in previous U.S. patents. For instance, Chuangtian et al.'s U.S. Pat. No. 4,826,283 describes an NLO device made from single crystals of LiB$_3$O$_5$. Huignard et al.'s U.S. Pat. No. 4,659,223 provides an interferometric device for measuring angular rotational speed. The device employs an amplifying photorefractive crystal, such as a bismuth-silicon oxide crystal or a barium titanate crystal.

Although a number of NLO compounds are known, most of these materials exhibit deficiencies that limit their utility, including: excessive energy requirements to induce the NLO effect; minimal SHG efficiency; NLO crystal damage resulting from exposure to high powered lasers; excessive absorption and light-scattering of incident light; and excessive production costs and synthesis times. *Chemistry of Materials*, Vol. 1, No. 5, 492-508 (1989). For instance, KTP (KTiOPO$_4$) costs approximately $300,000 per ounce and the Airtron method of synthesizing KTP takes approximately five to six weeks to complete.

Thus, there is a need for NLO compounds that overcome these problems and are suitable for use in high-speed optical computers and other such devices.

SUMMARY OF THE INVENTION

The present invention addresses many of the disadvantages of known NLO materials.

An object of the present invention is to provide NLO materials having reduced production costs relative to NLO materials currently available.

Another object of the present invention is to provide a facile and efficient method of synthesizing NLO materials.

Still another object of the present invention is to provide NLO materials having an efficient, simple harmonic generation (SHG) capability.

Still another object of the present invention is to provide an NLO material that is not damaged by high powered lasers.

Another object of the present invention is to provide NLO materials having attractive physical properties for use in high speed optical computers and in similar applications.

The present invention comprises a new class of NLO compounds having the general formula $Ca_{1.40-x}M_xV_{0.98\pm0.05}O_{4.00\pm0.08}$ wherein X may have a value between 0.07 and 0.43, and M is selected from a group consisting of bismuth, the rare earth metals, and mixtures thereof. The compounds satisfying this formula are acentric and may be described as a hexagonal unit cell that belongs to the space group R3c wherein $a=b=10.8\pm0.1$ Å and $c=38.0\pm0.3$ Å.

The NLO compounds of this invention double the frequency of light incident upon such compounds. For instance, compounds satisfying the molecular formula double the frequency of 1064 nm light emitted from a YAG:Nd laser from about 0.5 to about 3.3 times the efficiency of KH$_2$PO$_4$ (KDP). Moreover, no damage to the NLO material is caused by the YAG:Nd laser. These factors, along with the inexpensive, efficient synthetic approach described below, make this class of NLO materials attractive for applications such as medical lasers or other optic devices.

NLO materials satisfying the general formula are synthesized by first forming a mixture using a source of calcium ions, a source of vanadium ions and source of bismuth or rare earth metal ions. The mixture is then heated to a temperature from about 700° C. to about 900° C. for at least about an hour, and more typically from about 4 hours to about 80 hours. After the mixture is heated at the first temperature, it is then heated at a second temperature from about 900° C. to about 1200° C. for at least about an hour, and more typically for about 4 hours to about 80 hours. Crystals of the material are then formed by heating the resulting compounds above the melting point of the material and then cooling the material at a rate from about 3° C. per hour to about 15° C. per hour. Crystals can also be formed by various methods known in the art, such as pulling crystals from a top-seeded melt.

The present invention, as well as additional objects and applications of the NLO material described herein, will become more apparent from the following detailed description of the invention.

DETAILED DESCRIPTION

Figure 1:
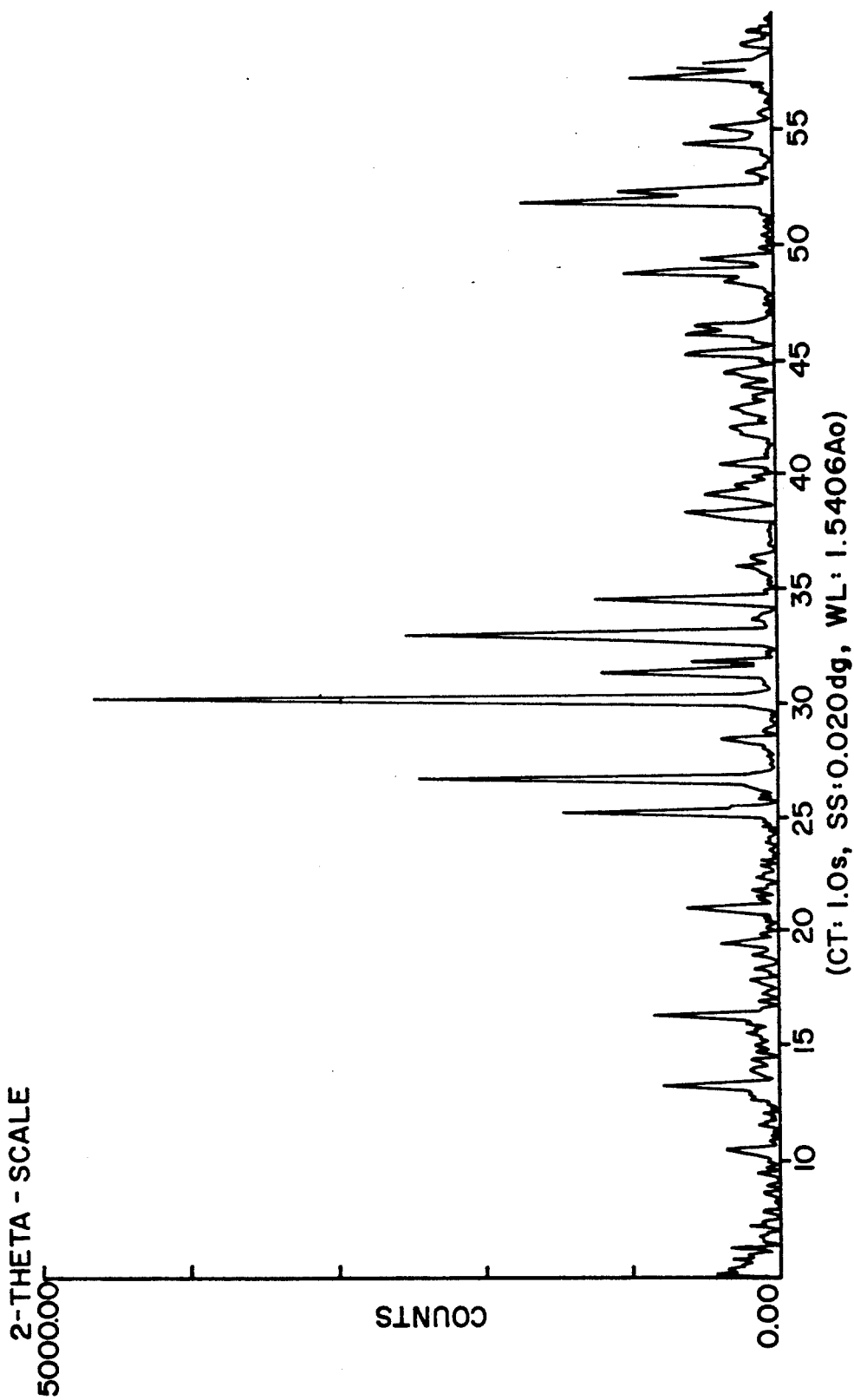
FIG. 1 is an X-ray powder diffraction pattern of the NLO material in the Ca/Bi/V/O system.

NLO materials according to this invention are complex vanadium metal oxides that double the frequency of light such as that light emitted from a YAG:Nd laser (1064 nm). The vanadium metal oxide NLO materials typically lie within a composition range of about $Ca_{1.40-x}M_xV_{0.98\pm0.05}O_{4.00\pm0.08}$ wherein X may have a value between 0.07 and 0.43. M may be a variety of metals, including bismuth and the rare earth metals such as La, Ce, Y, Pm, Pr, Nd, Sm, Eu, Gd, Tb, Dy, Ho, Er, Tm, Yb, Lu, Sc, and mixtures thereof. To date, many such materials have been synthesized by varying the metal. Virtually all such compounds exhibit SHG behavior when light of 1064 nanometers is focused on the surface of the material, unless the compound absorbs light at either 1064 or 532 nanometers. For instance, $Ca_{1.29}Ce_{0.14}VO_4$ does not exhibit SHG behavior when light of 1064 nm is focused on the material. However, if a laser of another frequency is focused on the material, SHG behavior would be observed.

GENERAL PROCEDURE FOR SYNTHESIZING THE NLO COMPOUNDS

To synthesize the compounds, a mixture is formed by combining appropriate stoichiometric amounts, as indicated in the examples below, of a source of calcium ions, a source of vanadium ions and a source of rare earth metal ion or bismuth ion. Although one skilled in the art will understand that the stoichiometric ratios may vary from compound-to-compound, a typical stoichiometric ratio is about 9Ca:7V:1M.

Calcium oxide, ammonium metavanadate, and the metal oxides are typically used to produce the compounds. However, one skilled in the art will realize that the source of calcium, vanadium and metal ions may vary. Generally, any calcium source that can decompose upon heating to provide CaO will suffice as a source of Ca ion. For purposes of illustration and not limitation, in addition to CaO the calcium ion can be obtained from calcium carbonate [($CaCO_3$)], calcium nitrate [$Ca(NO_3)_2$] and calcium hydroxide [$Ca(OH)_2$].

The source of vanadium can also vary. Generally, any compound that can decompose upon heating to provide $V_2O_5$ will suffice as a source of V ion. It should be understood by one skilled in the art that any suitable source of vanadium will suffice when used in the appropriate stoichiometric ratio. Ammonium metavanadate and vanadium pentoxide ($V_2O_5$) are, without limitation, appropriate sources of V ion.

As with Ca and V, any metal ion source that thermally decomposes to provide $M_2O_3$ will suffice as a source of metal ion. $M(NO_3)_3$ and $M_2O_3$ are the typical sources of metal ions.

Appropriate molar amounts of the respective constituent materials are ground together in a mortar. Generally, the reagents can be ground in the mortar open to the surrounding atmosphere. However, a preferred method of forming the mixture is to grind the reagents under a small amount of hexane. The mixture of reactants is then placed in a crucible such as an $Al_2O_3$ crucible, and heated at a typical heating rate of about 400° C./hour to a temperature of about 700° C. to about 900° C. using an electrical resistance furnace. The mixture is maintained at this temperature for a first period of time greater than about one hour, and generally from about 4 to about 80 hours. Even more typically, the present invention heats the mixture of inorganic reagents to a first temperature of about 700° C. for a first period of time of approximately 12 hours.

After the mixture of reactants has been heated at the first temperature, the mixture is then heated to a second temperature from about 900° C. to about 1200° C. at a typical heating rate of about 400° C./hour. Prior to this second heating, the mixture may be allowed to cool and then reground. The mixture is heated at the second temperature for a second period of time that is greater than about one hour and is generally from about 4 hours to about 80 hours. Again, even more typically, the present invention heats the mixture at a second temperature of 900° C. for a second period of time of about 12 hours.

It should be noted that heating sequences other than those noted might provide the NLO materials contemplated by the present invention. Of course, there are limitations on the temperatures selected. For instance, if the temperature is too high, the synthesized compound, which may not be stable at elevated temperatures, will decompose. However, if the temperature is too low, then the rate of reaction may be so slow as to be impractical. Although somewhat arbitrary, the heating sequences described above have been found to provide good yields of the NLO compounds.

Once the mixture has been heated according to the procedure described above, the mixture is removed from the heat source and allowed to cool to room temperature at a typical cooling rate of about 100° C./minute. The material produced according to this procedure may be grown into crystals according to procedures known in the art, such as pulling the crystals from a top-seeded melt.

Alternatively, the compounds can be grown into crystals by employing a series of cooling steps. For instance, the compound is first melted by heating the compound to about 1400° C. (1250° C. is sufficient when the compounds contain Bi) using an electrical resistance furnace. The material is then allowed to cool at a rate of about 15° C./hour until a temperature of about 1200° C. is reached. The material is then held at this temperature for a period of time that is less than about one hour and is generally on the order of about ten minutes. The material is held at this and subsequent cooling plateaus to allow crystal growth occurring at that temperature to conclude. The material is then allowed to cool at a rate of about 3° C./hour until a temperature of about 1150° C. is reached. The material is maintained at this temperature for a period of time that is generally less than about an hour, and is typically on the order of about 30 minutes. The material is then cooled for a period of about 30–40 hours at a rate of about 15° C./hour. Once the material reaches 600° C., the compound is cooled to room temperature at a rate of about 60° C./hour. In this manner, crystals suitable for SHG testing are obtained.

SYNTHESIS OF THE Ca/Bi/V/O SYSTEM

To produce the NLO materials of the Ca/Bi/V/O system, calcium oxide (CaO), ammonium metavanadate ($NH_4VO_3$), and bismuth(III)oxide ($Bi_2O_3$) were added to a crucible. Thus, 0.6730 gms (0.0120 moles) of calcium oxide (molecular weight=56.08, MP=2614° C.), 1.052 gms (0.0090 moles) of ammonium metavanadate (molecular weight=116.98, decomposes at 200° C.), and 0.2330 gms (0.00050 moles) of bismuth(III)oxide (molecular weight=465.96, MP=825° C.) were ground under hexane in an agate mortar. This mixture was then heated at a rate of about 400° C./hour to a temperature of 700° C. The sample is maintained at 700° C. for six hours. The purpose of this first heating stage is mainly to decompose $NH_4VO_3$. Once the heating of the material at the first temperature was complete, the mixture was cooled, reground, and then heated at a second temperature of about 900° C. for a period of about 72 hours. Upon cooling, the heated mixture afforded a light yellow powder, which, when subjected to X-ray powder evaluation, produced the spectra shown in FIG. 1.

To grow crystals of the material, the powder sample was placed in a platinum crucible and heated in an electrical resistance furnace to 1240° C. The sample was maintained at this temperature for approximately 10 minutes. The sample was then cooled to 1200° C. at 15° C./hour, held at 1200° C. for 10 minutes, cooled at 3° C./hour to 1150° C., held there for 30 minutes, cooled at 15° C./ hour to 600° C., and then finally followed by cooling to room temperature at about 60° C./hour. Using this procedure, crystals of $Ca_{1.40-x}Bi_xV_{0.98\pm0.05}O_{4.00\pm0.08}$ were obtained having dimensions greater than $5 \times 5 \times 5$ mm$^3$. It should be understood by one skilled in the art that other methods of growing crystals will work. One such method, by way of example and not limitation, would include pulling crystals from a top-seeded melt.

Several crystals obtained from the forgoing procedure were mounted on glass fibers for single-crystal structure determination using a Rigaku single-crystal X-ray diffractometer. Structure analysis of the data obtained indicates that the material forms crystals in the rhombohedral space group R3c that may be described with hexagonal unit cell parameters a=b=10.877(7) Å, c=38.026(8) Å, $\alpha=\beta=90°$, and $\gamma=120°$. The numbers in parentheses indicate standard deviations. The formula from the single crystal X-ray data is $Ca_{1.40-x}Bi_xV_{0.98\pm0.05}O_{4.00\pm0.08}$ wherein X may vary from 0.07 to 0.43. The crystal structure data based on R3c space group and X=0.1 is presented in Table 1. Most of the vanadium atoms are coordinated by four oxygen atoms in an approximated tetrahedral coordination. However, one vanadium atom ($V_3$ in Table 1) may have a fifth oxygen coordinated to it.

Several crystals obtained from the forgoing procedure were ground and examined using a Philips powder X-ray diffractometer. The powder pattern is given in FIG. 1. This experimental powder pattern agrees well with the calculated one based on the crystal structure data given in Table 1.

TABLE 1

Positional Parameters for
$Ca_{1.40-x}Bi_xV_{0.98\pm0.05}O_{4.00\pm0.08}$ with X = 0.1

| Atom | Position | X | Y | Z |
|---|---|---|---|---|
| Ca(Bi)1 | b | 0.62 | −0.18 | 0.23 |
| Ca(Bi)2 | b | 0.47 | .53 | .60 |
| Ca(Bi)3 | b | 0.73 | −0.14 | 0.32 |
| Ca(Bi)4 | a | 0 | 0 | $\frac{1}{4}$ |
| $V_1$ | b | 0.49 | 0.01 | 0.20 |
| $V_2$ | b | 0.84 | 0.19 | 0.97 |
| $V_3$ | a | $\frac{1}{3}$ | $\frac{1}{3}$ | 0.43 |

In a manner similar to that discussed in the foregoing paragraphs, the following compounds have been synthesized: $Ca_{1.29}Y_{0.14}VO_4$, $Ca_{1.29}La_{0.14}VO_4$, $Ca_{1.29}Nd_{0.14}VO_4$, $Ca_{1.29}Ce_{0.14}VO_4$, $Ca_{1.29}Dy_{0.14}VO_4$, $Ca_{1.29}Er_{0.14}VO_4$, $Ca_{1.29}Eu_{0.14}VO_4$, $Ca_{1.29}Gd_{0.14}VO_4$, $Ca_{1.29}Ho_{0.14}VO_4$, $Ca_{1.29}Lu_{0.14}VO_4$, $Ca_{1.29}Pr_{0.14}VO_4$, $Ca_{1.29}Sm_{0.14}VO_4$, $Ca_{1.29}Tb_{0.14}VO_4$, $Ca_{1.29}Yb_{0.14}VO_4$ and $Ca_{1.29}Sc_{0.14}VO_4$. Each of these compounds had X-ray powder diffraction patterns substantially similar to those shown in FIGS. 1–3. The yields of these reactions are essentially quantitative. For specific information regarding stoichiometric amounts, heating temperatures and heating times, please refer to the examples included at the end of the detailed description. The third reactant used to produce these materials is typically $Y_2O_3$, $La_2O_3$, $Nd_2O_3$, $CeO_2$, $Dy_2O_3$, $Er_2O_3$, $Eu_2O_3$, $Gd_2O_3$, $Ho_2O_3$, $Lu_2O_3$, $Pr_6O_{11}$, $Sm_2O_3$, $Tb_4O_7$, $Yb_2O_3$, and $Sc_2O_3$.

Figure 2:
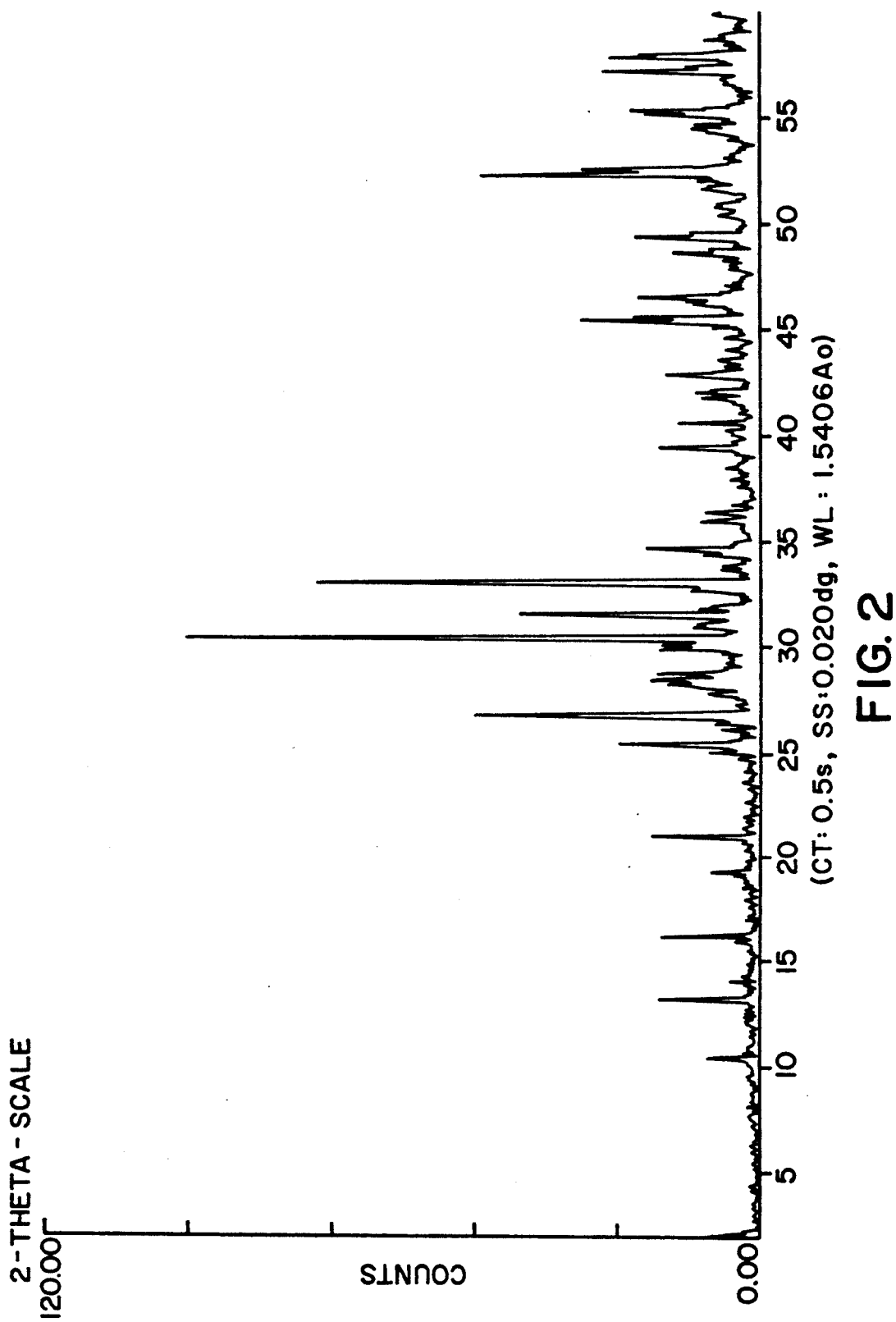
FIG. 2 is an X-ray powder diffraction pattern of the NLO material in the Ca/Sc/V/O system.
Figure 3:
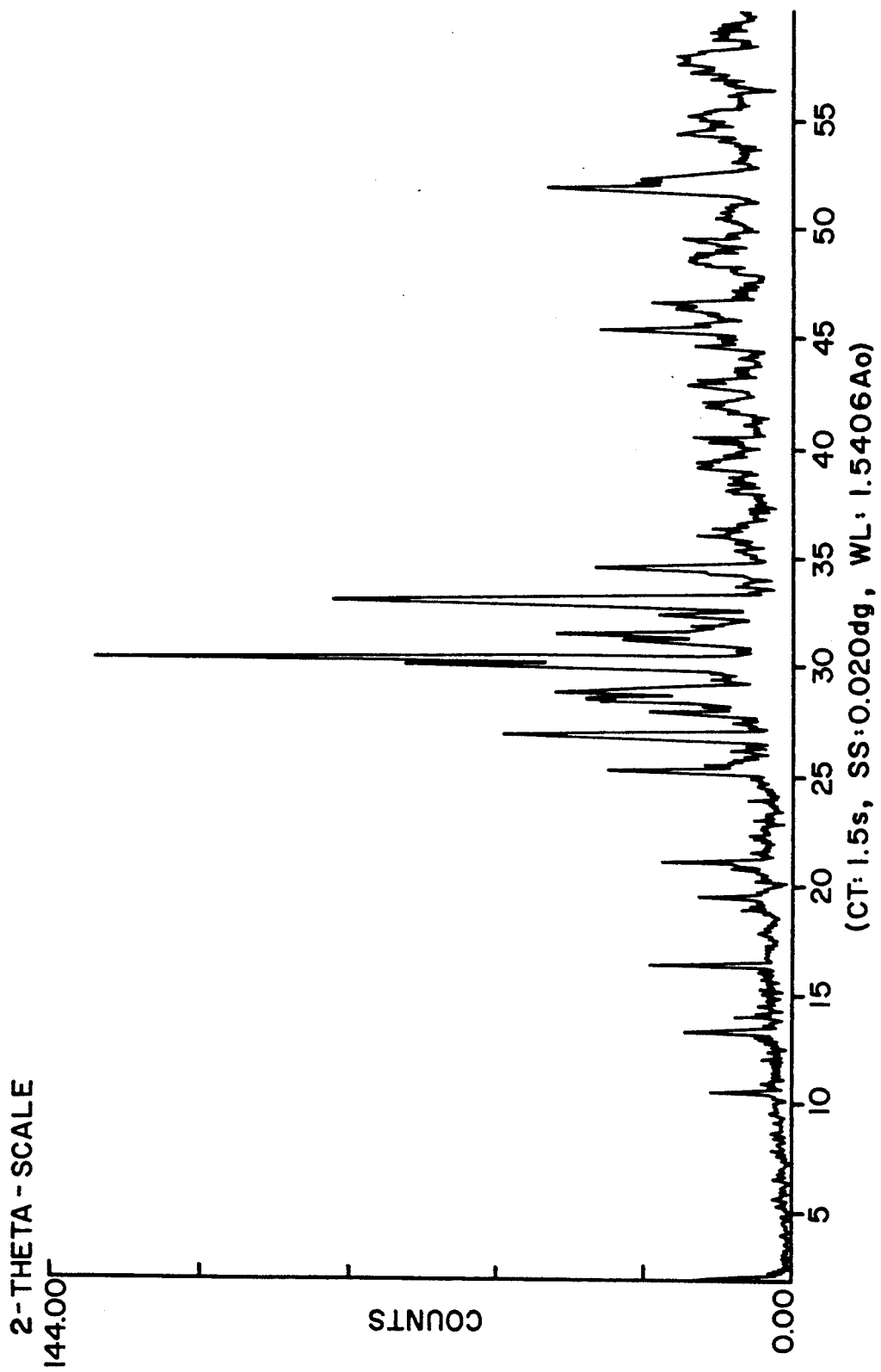
FIG. 3 is an X-ray powder diffraction pattern of the NLO material in the Ca/Y/V/O system.
Figure 4:
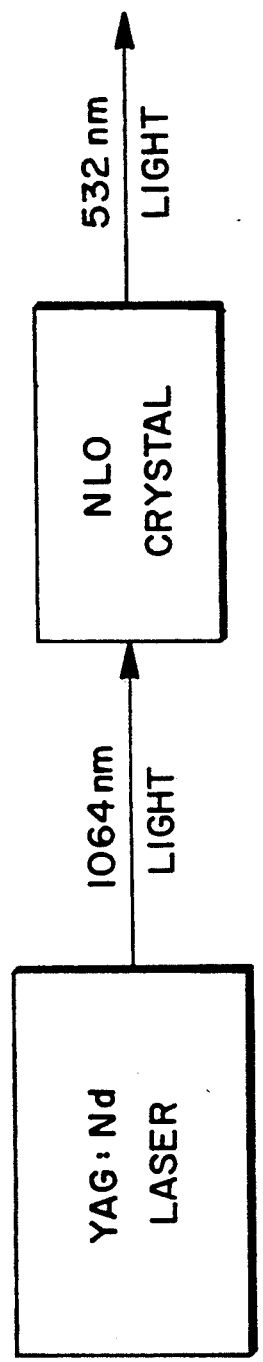
FIG. 4 is a schematic diagram of a YAG:Nd laser used to test the SHG of the NLO materials.

The NLO materials are evaluated by the Kurtz powder technique for second harmonic generation (SHG) using a YAG:Nd laser which emits 1064 nm radiation. FIG. 2 shows a schematic diagram of the testing apparatus. Polycrystalline samples of the NLO materials were exposed to a fixed flux of the YAG:Nd radiation. The intensity of light emitted at twice the frequency of the laser's frequency was monitored with a photomultiplier. All such measurements were made relative to KDP ($KH_2PO_4$), a well-known second harmonic generator. Table 2 lists the SHG signals of the materials tested to date.

TABLE 2

| Compound | SHG Signal (relative to KDP) |
|---|---|
| 1. $Ca_{1.29}La_{0.14}VO_4$ | 1.5 |
| 2. $Ca_{1.29}Nd_{0.14}VO_4$ | 0.36 |
| 3. $Ca_{1.29}Dy_{0.14}VO_4$ | 0.71 |
| 4. $Ca_{1.29}Er_{0.14}VO_4$ | 0.26 |
| 5. $Ca_{1.29}Eu_{0.14}VO_4$ | 1.43 |
| 6. $Ca_{1.29}Gd_{0.14}VO_4$ | 1.36 |
| 7. $Ca_{1.29}Ho_{0.14}VO_4$ | 1.07 |
| 8. $Ca_{1.29}Lu_{0.14}VO_4$ | 1.62 |
| 9. $Ca_{1.29}Pr_{0.14}VO_4$ | 1.48 |
| 10. $Ca_{1.29}Sm_{0.14}VO_4$ | 0.93 |

TABLE 2-continued

| Compound | SHG Signal (relative to KDP) |
| --- | --- |
| 11. $Ca_{1.29}Tb_{0.14}VO_4$ | 1.67 |
| 12. $Ca_{1.29}Yb_{0.14}VO_4$ | 1.60 |
| 13. $Ca_{1.29}Sc_{0.14}VO_4$ | 1.55 |
| 14. $Ca_{1.29}Bi_{0.14}VO_4$ | 3.30 |
| 15. $Ca_{1.29}Y_{0.14}VO_4$ | 1.16 |

Single crystals produced in the manner described above have also been evaluated in the laboratory of physics Professor William Hetherington of Oregon State University. The process used to evaluate the crystals was based on the brightness of green light (532 nm) generated from the frequency doubling of the 1064 nm light of the YAG:Nd laser. Tests in Professor Hetherington's laboratory indicate that single crystals from the Ca/Bi/V/O system had a high efficiency for second harmonic generation. Furthermore, laser damage at the higher power output levels could not be detected.

EXAMPLE 1

This example describes the preparation of NLO material in the Ca/Y/V/O. 0.6281 gm (0.0112 moles) of calcium oxide (MW=56.08), 0.9826 gm (0.0084 moles) of ammonium metavanadate (MW=116.98) and 0.0903 gm (0.000399 moles) of yttrium oxide ($Y_2O_3$, MW=225.81) were ground together under hexane in an agate mortar. The mixture was then heated at a first temperature of 700° C. for approximately 12 hours. The temperature was raised to a second temperature of about 900° C. and maintained at that temperature for about 48 hours. The SHG signal for this light yellow sample was 1.1 times that of KDP. Examination of the X-ray diffraction powder pattern showed that this product was composed primarily of the rhombohedral structure previously described.

EXAMPLE 2

This example describes the preparation of $Ca_{1.29}La_{0.14}VO_4$. 0.6281 gm of calcium oxide, 0.9826 gm of ammonium metavanadate and 0.1313 gm (0.000403 moles) of lanthanum oxide ($La_2O_3$, MW=325.82) were treated in the same manner as in Example 1. The SHG signal for this light yellow sample is about 1.5 times that of KDP.

EXAMPLE 3

This example describes the preparation of $Ca_{1.29}Nd_{0.14}VO_4$. 0.6281 gms of CaO, 0.9826 gms of ammonium metavanadate and 0.1346 gms (0.000400 moles) of neodymium oxide ($Nd_2O_3$, MW=336.54 g/mol) were treated as in Example 1. The SHG signal of this new sample is about 0.36 times that of KDP.

EXAMPLE 4

This example describes the preparation of $Ca_{1.29}Ce_{0.14}VO_4$. 0.6281 gms of calcium oxide, 0.9826 gms of ammonium metavanadate and 0.1859 gms of cerium oxide ($CeO_2$, mw=172.12) were treated in the same manner as in Example 1. The crystals produced by this reaction were dark yellow in color and therefore no SHG signal could be observed using 1064 nm incident light.

EXAMPLE 5

This example describes the preparation of $Ca_{1.29}Dy_{0.14}VO_4$. 0.6281 gms of calcium oxide, 0.9826 gms of ammonium metavanadate and 0.2013 gms (0.000540 moles) of dysprosium(III)oxide ($Dy_2O_3$, MW=373.00 g/mol) were ground together under hexane in an agate mortar. The mixture was then treated as in Example 1. The SHG signal for this light yellow sample was 71% of KDP.

EXAMPLE 6

This example describes preparation of $Ca_{1.29}Er_{0.14}VO_4$. 0.6281 gms of calcium oxide, 0.9826 gms of ammonium metavanadate and 0.2065 (0.000540 mol) gms of erbium(III)oxide ($Er_2O_3$, MW=382.52 g/mol) were treated in the same manner as in Example 1. The SHG signal for this pink sample is about 26% of KDP.

EXAMPLE 7

This example describes the preparation of $Ca_{1.29}Eu_{0.14}VO_4$. 0.6281 gms of CaO, 0.9826 gms of ammonium metavanadate and 0.1901 gms (0.000540 g/mol) of europium(III)oxide ($Eu_2O_3$, MW=351.92 g/mol) were treated as in Example 1. The SHG signal of this new sample is about 1.43 times that of KDP.

EXAMPLE 8

This example describes the preparation of $Ca_{1.29}Gd_{0.14}VO_4$. 0.6281 gms of calcium oxide, 0.9826 gms of ammonium metavanadate and 0.1958 (0.000540 moles) gm of gadolinium(III)oxide ($Gd_2O_3$, MW=362.50 g/mol) were treated in the same manner as in Example 1. The SHG signal of this light yellow sample was about 1.36 times that of KDP.

EXAMPLE 9

This example describes the preparation of $Ca_{1.29}Ho_{0.14}VO_4$. 0.6281 gms of calcium oxide, 0.9826 gms of ammonium metavanadate and 0.2040 gm (0.00054 mol) of holmium oxide ($Ho_2O_3$, MW=377.869 g/mol) were treated as in Example 1. The SHG signal for this light yellow sample was 1.07 times that of KDP.

EXAMPLE 10

This example describes the preparation of $Ca_{1.29}Lu_{0.14}VO_4$. 0.6281 gms of calcium oxide, 0.9826 gms of ammonium metavanadate and 0.2148 (0.000540 mol) gms of lutetium oxide ($Lu_2O_3$, MW=397.94 g/mol) were treated in the same manner as in Example 1. The SHG signal for this light yellow sample is about 1.62 times that of KDP.

EXAMPLE 11

This example describes the preparation of $Ca_{1.29}Pr_{0.14}VO_4$. 0.6281 gms of CaO, 0.9826 gms of ammonium metavanadate and 0.2013 gms (0.000197 mol) of praseodymium oxide ($Pr_6O_{11}$, MW=1021.44 g/mol) were treated as in Example 1. The SHG signal of this sample is about 1.48 times that of KDP.

EXAMPLE 12

This example describes the preparation of $Ca_{1.29}Sm_{0.14}VO_4$. 0.6281 gms of calcium oxide, 0.9826 gms of ammonium metavanadate and 0.1883 (0.000540 mol) gms of samarium oxide ($Sm_2O_3$, MW=348.70 g/mol) were treated in the same manner as in Example 1. The SHG signal of this sample is about 93% of KDP.

EXAMPLE 13

This example describes the preparation of $Ca_{1.29}Tb_{0.14}VO_4$. 0.6281 gms of calcium oxide, 0.9826 gms of ammonium metavanadate and 0.2019 gms (0.000270 mol) of terbium oxide ($Tb_4O_7$, MW=747.69) were treated in the same manner as in Example 1. The SHG signal for this light yellow sample was 1.67 times that of KDP.

EXAMPLE 14

This example describes the preparation of $Ca_{1.29}Yb_{0.14}VO_4$. 0.6281 gms of calcium oxide, 0.9826 gms of ammonium metavanadate and 0.2128 gm (0.00054 moles) of ytterbium oxide ($Yb_2O_3$, MW=394.08 g/mol) were treated in the same manner as in Example 1. The SHG signal for this light yellow sample is about 1.60 times that of KDP.

EXAMPLE 15

This examples describes the preparation of $Ca_{1.29}Sc_{0.14}VO_4$. 0.6281 gms of CaO, 0.9826 gms of ammonium metavanadate and 0.2398 gms (0.00054 moles) of scandium oxalate (MW=444.34) were treated as in Example 1. The SHG signal of this light yellow sample is about 1.55 times that of KDP.

EXAMPLE 16

This example describes the preparation of $Bi_{0.04}Lu_{0.114}Ca_{1.29}VO_4$. 0.6123 g (0.0109 moles) of CaO, 0.9825 g (0.0084 moles) of vanadium metavanadate ($NH_4VO_3$, MW=116.98, decomposes at 200° C.), 0.1258 g (0.0002699 moles) of bismuth(III)trioxide ($Bi_2O_3$, MW=465.96), and 0.1034 g (0.0002598 moles) of lutetium oxide ($Lu_2O_3$, MW=397.94) were mixed and ground in an agate mortar. The mixture was heated at 700° C. for 6 hours, ground, then heated at 900° C. for 12 hours.

To grow crystals, the product was heated to 1400° C., held at this temperature for 10 minutes, cooled to 1250° C. at a rate of 15° C./hour. The sample was held at 1250° C. for 10 minutes and slowly cooled down to 900° C. (3° C./hour). Finally, it was cooled down to room temperature at 60° C./hour. Yellow crystals were obtained from this procedure.

Microprobe analysis gave the ratio:

Bi:Lu:Ca:V=0.3:0.8:9.0:7.0.

Having illustrated and described the principles of the invention in detail, it should be apparent to those skilled in the art that the invention can be modified in arrangement and detail without departing from such principles. We claim all modifications coming within the spirit and scope of the following claims.

We claim:

1. A compound of the formula $Ca_{1.40-X}M_XV_{0.98\pm0.05}O_{4.00\pm0.08}$ wherein X is 0.07 to 0.43 and M is selected from the group consisting of Bi, La, Ce, Y, Pm, Pr, Nd, Sm, Eu, Gd, Tb, Dy, Ho, Er, Tm, Yb, Lu, Sc, and mixtures thereof.

2. A compound according to claim 1 which grows into crystals to provide a crystal structure defined by a hexagonal unit cell belonging to the space group R3c having a=b=10.8±0.1 Å, and c=38.0±0.3 Å.

3. A compound according to claim 2 wherein the crystalline compound doubles the frequency of light emitted from a laser.

4. A compound according to claim 3 that doubles the frequency of light emitted from a YAG:Nd laser from about 0.1 to about 3.0 times the efficiency of $KH_2PO_4$.

5. A compound according to claim 1 selected from the group consisting of $Ca_{1.29}Y_{0.14}VO_4$, $Ca_{1.29}La_{0.14}VO_4$, $Ca_{1.29}Nd_{0.14}VO_4$, $Ca_{1.29}Ce_{0.14}VO_4$, $Ca_{1.29}Dy_{0.14}VO_4$, $Ca_{1.29}Er_{0.14}VO_4$, $Ca_{1.29}Eu_{0.14}VO_4$, $Ca_{1.29}Gd_{0.14}VO_4$, $Ca_{1.29}Ho_{0.14}VO_4$, $Ca_{1.29}Lu_{0.14}VO_4$, $Ca_{1.29}Pr_{0.14}VO_4$, $Ca_{1.29}Sm_{0.14}VO_4$, $Ca_{1.29}Tb_{0.14}VO_4$, $Ca_{1.29}Yb_{0.14}VO_4$, $Ca_{1.29}Bi_{0.14}VO_4$ and $Ca_{1.29}Sc_{0.14}VO_4$.

6. A compound according to claim 1 having a molecular formula of $Ca_{1.29}Bi_{0.04}Lu_{0.114}VO_4$.

7. A method for producing a compound, the method comprising the steps of:
providing a mixture by combining: (a) a source of calcium ions, (b) a source of vanadium ions, and (c) a source of rare earth metal ions, step (a), step (b) and step (c) being combined in a ratio suitable to provide, upon heating, a compound according to the formula $Ca_{1.40-X}M_XV_{0.98\pm0.05}O_{4.00\pm0.08}$ wherein X is 0.07 to 0.43 and M is selected from the group consisting of Bi, La, Ce, Y, Pm, Pr, Nd, Sm, Eu, Gd, Tb, Dy, Ho, Er, Tm, Yb, Lu, Sc, and mixtures thereof; and
heating the mixture at a temperature from about 700° C. to about 1200° C. for at least about 1 hour and less than about 100 hours.

8. A method according to claim 7 wherein steps (a), (b), and (c) are combined in a ratio of about 9(a):7(b):1(c).

9. A method according to claim 7 wherein step (a) is CaO.

10. A method according to claim 7 wherein step (a) is a compound that decomposes upon heating to provide CaO.

11. A method according to claim 10 wherein step (a) is selected from the group consisting of $CaCO_3$, $Ca(NO_3)_2$, and $Ca(OH)_2$.

12. A method according to claim 7 wherein step (b) is $V_2O_5$.

13. A method according to claim 7 wherein step (b) is a compound that decomposes upon heating to provide $V_2O_5$.

14. A method according to claim 13 wherein step (b) is $NH_4VO_3$.

15. A method according to claim 7 wherein step (c) is $M(NO_3)_3$.

16. A method according to claim 7 wherein step (c) is $M_2O_3$.

17. A method according to claim 7 wherein step (c) is selected from the group consisting of $Bi_2O_3$, $La_2O_3$, $CeO_2$, $Pr_6O_{11}$, $Nd_2O_3$, $Sm_2O_3$, $Eu_2O_3$, $Gd_2O_3$, $Tb_4O_7$, $Dy_2O_3$, $Ho_2O_3$, $Er_2O_3$, $Tm_2O_3$, $Yb_2O_3$, $Y_2O_3$, $Sc_2O_3$.

18. The method according to claim 7 wherein step (a) is CaO, step (b) is $NH_4VO_3$, and step (c) is $Bi_2O_3$.

19. A method according to claim 7 including the step of growing the compound into crystals.

20. A method according to claim 19 wherein growing the compound into crystals comprises the steps of:
melting a powder sample of the compound by heating the sample to a first temperature that is above the melting point of the compound;
cooling the melted compound at a rate of about 15° C./hour to a second temperature wherein the compound is cooled from about 2 to about 4 hours;
holding the compound at the second temperature for a first period of time of less than about 1 hour;

cooling the compound at about 3° C./hour to a third temperature, wherein the compound is cooled from about 2 to about 4 hours;

holding the compound at the third temperature for a period of time of less than about 1 hour;

cooling the compound at about 15° C./hour to about 600° C. wherein the material is cooled from about 35 hours to about 40 hours; and cooling the material to room temperature by cooling at a rate of about 60° C./hour.

21. A method according to claim 20 wherein the first temperature is about 1400° C., the second temperature is about 1200° C. and the third temperature is about 1150° C.

22. A method according to claim 20 wherein the compound is grown into crystals by pulling crystals from a top-seeded melt.

23. A laser crystal having a structure defined by a hexagonal unit cell belonging to the space group R3c with $a=b=10.8\pm0.1$ Å and $c=38.0\pm0.3$ Å, wherein a, b and c are the hexagonal unit cell parameters.

24. A crystal according to claim 23 wherein the crystal doubles the frequency of light emitted from a laser.

25. A crystal according to claim 24 wherein the compound doubles the 1064 nm light emitted from a YAG:Nd laser from about 0.1 to about 3.3 times the efficiency of $KH_2PO_4$.

26. A compound consisting essentially of the elements Ca, V, O, $M_1$ and $M_2$ wherein $M_1$ and $M_2$ are selected from the group consisting of Bi, La, Ce, Y, Pm, Pr, Nd, Sm, Eu, Gd, Tb, Dy, Ho, Er, Tm, Yb, Lu, and Sc, the compound growing into crystals to provide a hexagonal unit cell that belongs to the space group R3c having hexagonal unit cell parameters $a=b=10.8\pm0.1$ Å and $c=38.0\pm0.3$ Å, wherein a, b and c are hexagonal unit cell parameters.

27. A compound according to claim 26 having a molecular formula of $Ca_{1.29}Bi_{0.04}Lu_{0.114}VO_4$.

28. A compound according to claim 26 that doubles the frequency of light emitted from a laser.

29. A compound consisting essentially of the elements Ca, Bi, V and O that can be grown into crystals to provide a crystal structure defined by a hexagonal unit cell belonging to the space group R3c with $a=b=10.8\pm0.1$ Å and $c=38.0\pm0.3$ Å, wherein a, b and c are hexagonal unit cell parameters.

30. A compound according to claim 29 that doubles the frequency of light emitted from a laser.

31. An NLO device comprising means to direct electromagnetic radiation at a first frequency on at least one crystal having a structure defined by a hexagonal unit cell belonging to the space group R3c with $a=b=10.8\pm0.1$ Å and $c=38.0\pm0.3$ Å, wherein a, b and c are hexagonal unit cell parameters, and a formula of $Ca_{1.40-x}M_xV_{0.98\pm0.5}O_{4.00\pm0.08}$ wherein X is 0.07 to 0.43 and M is selected from the group consisting of Bi, La, Ce, Y, Pm, Pr, Nd, Sm, Eu, Gd, Tb, Dy, Ho, Er, Tm, Yb, Lu, Sc, and mixtures thereof, wherein the electromagnetic radiation, after passing through the crystal, has a frequency that is some integer value of the frequency of the electromagnetic radiation directed on the crystal.

32. A device according to claim 31 wherein the electromagnetic radiation, after passing through the crystal, has a frequency that is twice the frequency of the electromagnetic radiation that is directed on the crystal.

33. An NLO device comprising means for directing electromagnetic radiation at a first frequency, on at least one crystal consisting essentially of the elements Ca, V, O, $M_1$ and $M_2$ wherein $M_1$ and $M_2$ are selected from the group consisting of Bi, La, Ce, Y, Pm Pr, Nd, Sm, Eu, Gd, Tb, Dy, Ho, Er, Tm, Yb, Lu, and Sc, the crystal providing a hexagonal unit that belongs to the space group R3c having hexagonal unit cell parameters $a=b=10.8\pm0.1$ Å and $c=38.0\pm0.3$ Å, wherein a, b and c are hexagonal unit cell parameters, wherein the electromagnetic radiation, after passing through the crystal, has a frequency that is some integer value of the frequency of the electromagnetic radiation directed on the crystal.

34. A device according to claim 33 wherein the electromagnetic radiation, after passing through the crystal, has a frequency that is twice the frequency of the electromagnetic radiation that is directed on the crystal.

* * * * *